United States Patent
Jahnke et al.

(10) Patent No.: US 6,775,732 B2
(45) Date of Patent: Aug. 10, 2004

(54) MULTIPLE TRANSACTION BUS SYSTEM

(75) Inventors: Steven R. Jahnke, Tokyo (JP);
Hiromichi Hamakawa, Ibaraki (JP)

(73) Assignee: Texas Instruments Incorporated, Dallas, TX (US)

(*) Notice: Subject to any disclaimer, the term of this patent is extended or adjusted under 35 U.S.C. 154(b) by 475 days.

(21) Appl. No.: 09/932,584

(22) Filed: Aug. 17, 2001

(65) Prior Publication Data

US 2002/0052999 A1 May 2, 2002

Related U.S. Application Data

(60) Provisional application No. 60/231,473, filed on Sep. 8, 2000.

(51) Int. Cl.[7] ............................................. G06F 13/00
(52) U.S. Cl. ...................................... 710/306; 710/313
(58) Field of Search ................................ 710/306, 308, 710/313

(56) References Cited

U.S. PATENT DOCUMENTS 5,740,461 A * 4/1998 Jaggar ........................ 712/41
6,094,700 A * 7/2000 Deschepper et al. ........ 710/313
6,249,834 B1 * 6/2001 Henderson et al. ......... 710/313
6,477,609 B1 * 11/2002 Reiss et al. ................. 710/306
6,567,881 B1 * 5/2003 Mojaver et al. ............ 710/313
6,631,437 B1 * 10/2003 Callison et al. ............. 710/313

FOREIGN PATENT DOCUMENTS

| EP | 0 814 408 A | 12/1997 |
| WO | WO 99 50753 A | 10/1999 |

* cited by examiner

Primary Examiner—Glenn A. Auve
(74) Attorney, Agent, or Firm—Robert D. Marshall, Jr.; W. James Brady, III; Frederick J. Telecky, Jr.

(57) ABSTRACT

This invention comprises a multiple transaction advanced high performance bus AHB system using two separate fully autonomous AHB buses, each having its own bus arbitration system with decoding to allow for simultaneous activity on the two AHB buses. The two buses are separated by and synchronized with an AHB-to-HTB bus bridge. The first bus, the Memory Bus AHB, contains the CPU and DMA as bus masters and the external memory controller and internal memory as slaves. The second bus, the Data Transfer Bus HTB, contains the high performance peripheral and any local RAM required.

12 Claims, 6 Drawing Sheets

MULTIPLE TRANSACTION BUS SYSTEM

This application claims priority under 35 USC §119(e)(1) of Provisional Application No. 60/231,473, filed Sep. 8, 2000.

TECHNICAL FIELD OF THE INVENTION

The technical field of this invention is data transfer and data bus systems within computer systems.

BACKGROUND OF THE INVENTION

As computer systems have grown more complex, it has become common to employ multiple processors and a wide variety of peripheral devices to transfer data within a chip and from the chip to external devices and vice versa. Such systems almost always have a multiple set of busses separating, for convenience and performance reasons, the communication between similar devices. Multiple bus systems must provide bus controllers to allow for coherent and collision-free communication between separate buses. Micro-controllers are used for this purpose and they provide bus arbitration which determines, at a given time, which device has control of the bus in question.

A prominent standard bus system has emerged for high performance micro-controller designs. The 'Advanced Micro-controller Bus Architecture System' AMBA has been defined by Advanced RISC Machines (ARM) Ltd. (Cambridge, U.K.) and is described in U.S. Pat. No. 5,740,461, dated Apr. 14, 1998. Computer systems of a CISC variety are complex instruction set computers and have total backward compatibility requirements over all versions. RISC (reduced instruction set computer) systems, by contrast, are designed to have simple instruction sets and maximized efficiency of operation. Complex operations are accomplished in RISC machines as well, but they are achieved by using combinations of simple instructions. The RISC machines of ARM Ltd. forming the AMBA architecture are of primary interest here.

The standard AMBA has two main busses, a high performance AHB bus and a peripheral bus APB of more moderate performance. The AHB bus is the main memory bus and contains RAM and an external memory controller. In this basic system definition, if a high performance peripheral is required that will transfer large amounts of data, this peripheral is also placed on the high performance AHB bus. This decreases system performance, however, because the central processor unit (CPU) cannot have access to memory when the peripheral has control of the bus.

Advanced RISC Machines Ltd (ARM) has proposed an efficient arbitration scheme and split transfers to allow the CPU and the high performance peripheral to share bus time of the single AHB bus. ARM has also proposed use of a second bus for isolation and using a single arbiter. This proposal still allows only one transaction to progress at a given time period.

SUMMARY OF THE INVENTION

This invention comprises a multiple transaction advanced high performance bus (MTAHB) system using two separate fully autonomous AHB-style buses. Each of these buses has its own bus arbitration system with decoding to allow for simultaneous activity on the two AHB-style buses. The first bus, the high performance memory bus, is exactly as defined for AHB busses in the AMBA specification of ARM. This AHB bus contains the CPU and direct memory access (DMA) unit as bus masters and the external memory interface controller and internal memory as bus slaves. The second bus, the high performance peripheral device bus (HTB), is also exactly as defined for AHB busses in the AMBA specification of ARM. The HTB contains the high performance peripheral and any local RAM required. The two buses are separated by and synchronized with an AHB-to-HTB bus bridge.

The extended AMBA system of this invention is referred to as the multiple transaction advanced high performance bus system (MTAHB) and it allows the CPU and the high performance peripheral to accomplish bus activity simultaneously. This is achieved by these devices residing on two separate AHB buses with individual, autonomous arbitration. System performance is increased because, instead of having just one bus master (either the CPU, the DMA or the high performance peripheral device) use the single AHB bus at any given time, two bus masters may perform work in the system concurrently. In this scheme both the memory bus master of the AHB bus and the high performance peripheral device master of the HTB bus have control of their individual AHB-style busses and can do work concurrently.

BRIEF DESCRIPTION OF THE DRAWINGS

These and other aspects of this invention are illustrated in the drawings, in which.

DETAILED DESCRIPTION OF PREFERRED EMBODIMENTS

The multiple transaction advanced high performance bus system (MTAHB) of this invention is used as an upgrade to the micro-controller bus architecture (AMBA) of Advanced RISC Machines Ltd. (ARM). The AMBA machines use RISC processors which are identified by the name ARM processors. Advanced RISC Machines Ltd. (Cambridge, U.K.) has been awarded U.S. Pat. No. 5,740,461, dated Apr. 14, 1998 in which this class of machines is fully described. The techniques used in this invention are of wider applicability, as will be shown, and can be used in a variety of multi-processor systems having multiple bus architectures.

Figure 1:
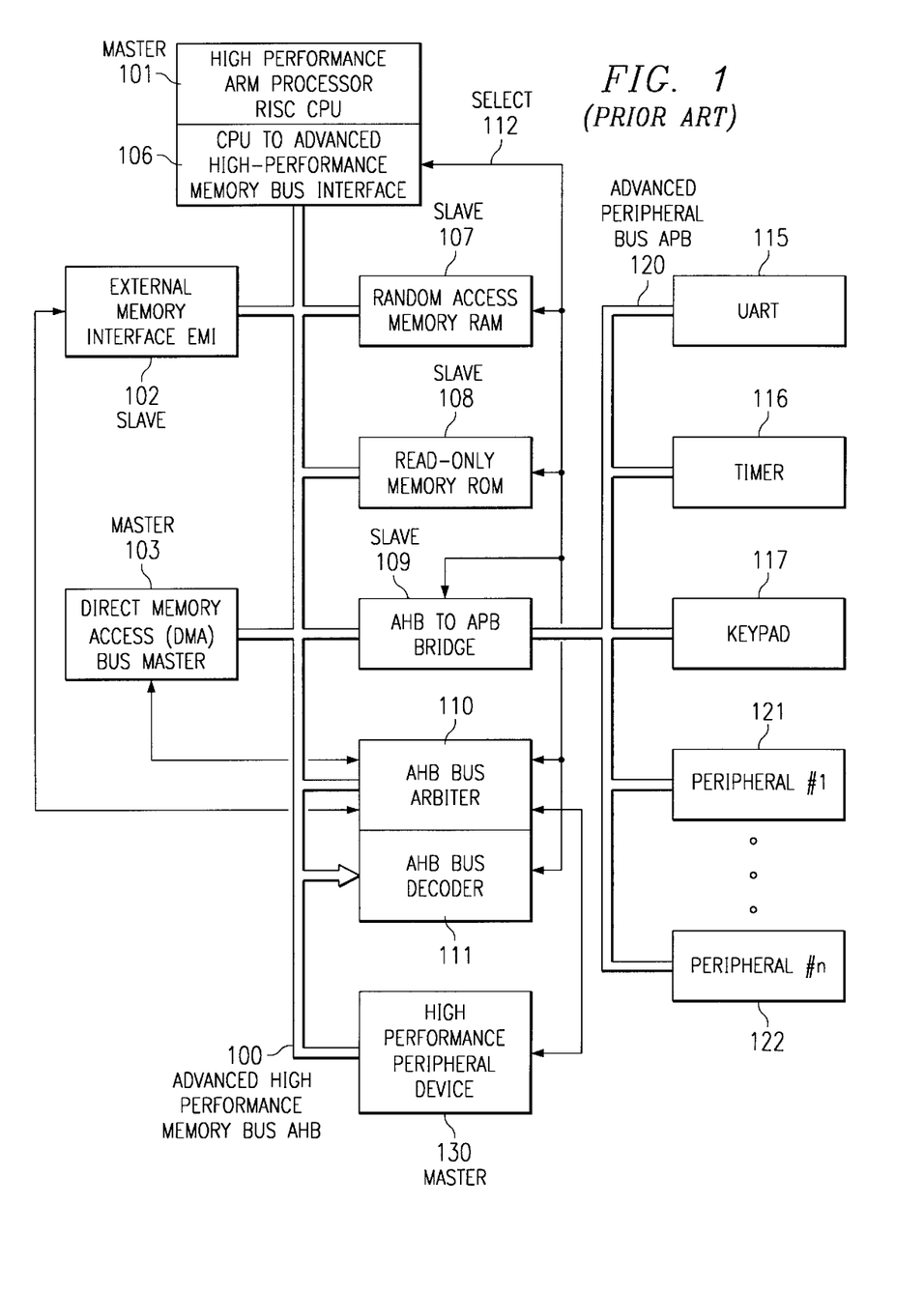
FIG. 1 illustrates the block diagram of a prior art advanced micro-controller bus architecture AMBA having a conventional AHB bus system.

FIG. 1 illustrates the AMBA standard. The AMBA has two main busses, an advanced high performance bus (AHB) 100 and an advanced peripheral bus (APB) 120 of more moderate performance. AHB bus 100 is the main memory bus and couples to CPU 101 via CPU advanced high performance memory bus interface 106 to random access memory (RAM) 107, read-only memory (ROM) 108 and an external memory interface (EMI) controller 102. FIG. 1 further illustrates a second master device direct memory access (DMA) unit 103 also coupled to AHB bus 100. Arbitration for bus access between the two masters, CPU 101 and DMA 103, takes place in M-bus arbiter 110. M-bus arbiter 110 controls access to the various slave devices via M-bus decoder 111 and select lines 112. In this basic system definition, if a high performance peripheral is required that will transfer large amounts of data, this peripheral is also placed on the high performance AHB bus 100. FIG. 1 illustrates such a high performance peripheral device 130. Placing this high performance peripheral device 130 on AHB bus 100 decreases system performance, because CPU 101 and DMA 103 cannot have access to memory when high performance peripheral device 130 has control of AHB bus 100. ARM has proposed an efficient arbitration scheme and split transfers to allow the CPU 101, DMA 103 and the high performance peripheral 130 to share bus time of the single AHB bus 100.

ARM has also proposed use of a second bus for isolation nd using a single arbiter. As shown in FIG. 1, this second bus is called the advanced peripheral bus (APB) 120. APB bus 120 operates in the same fashion as AHB bus 100. APB bus 120 is connected to AHB bus 100 via an AHB-to-APB bus bridge 109. AHB-to-APB bus bridge 109 is a slave to AHB bus 100. The two bus system with single M-bus arbiter 110 is of limited usefulness, because it allows only one transaction to progress at a given time period. Note that all high performance devices including memory and high performance peripheral device 130 are on AHB bus 100. All peripheral devices of moderate performance including UART 115, timer 116, keypad 117 as well as peripherals 121 to 122 reside on the peripheral bus 120.

Figure 2:
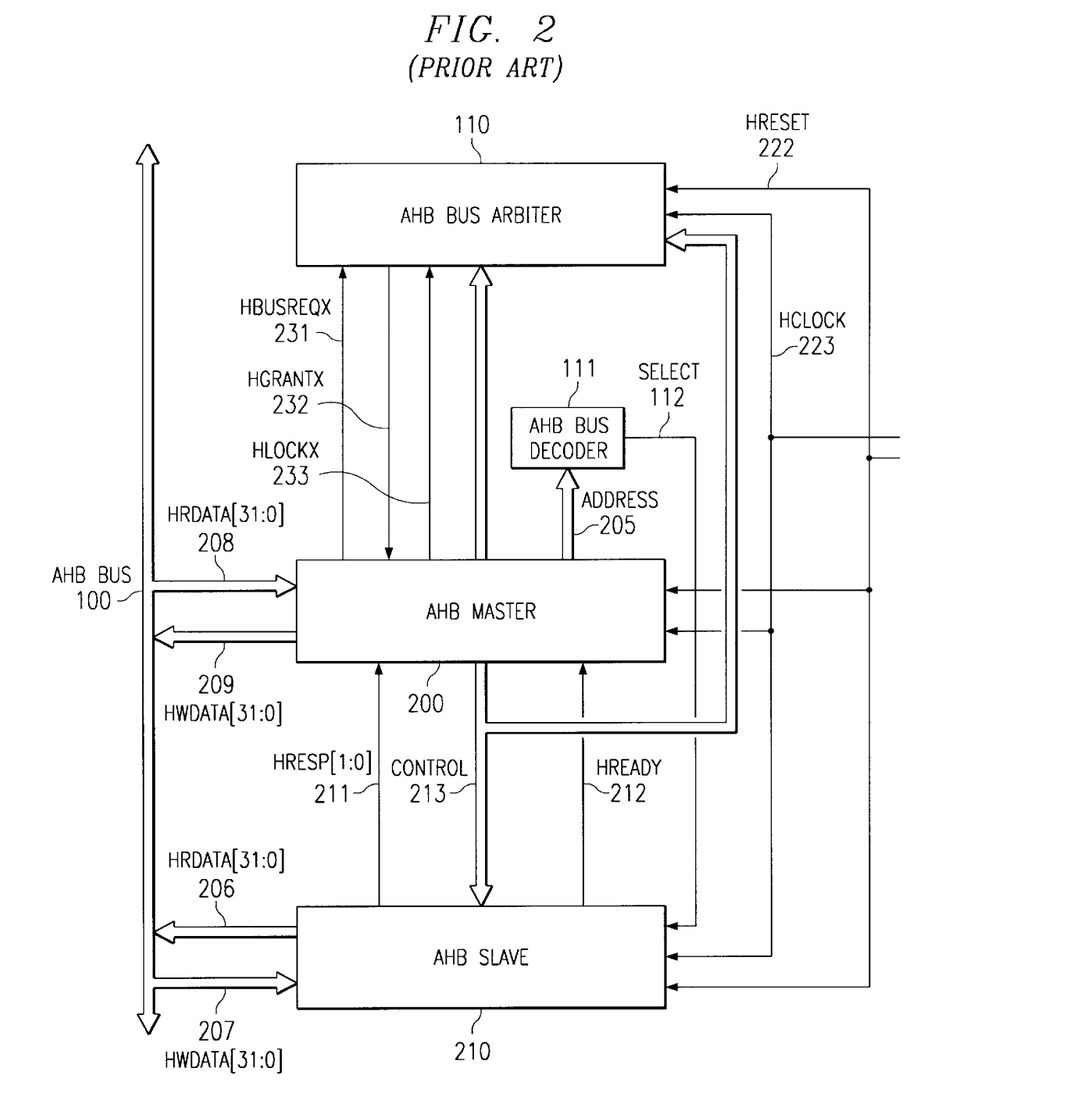
FIG. 2 illustrates the signal interconnections of a prior art single master, slave and arbiter combination in the AMBA architecture.

FIG. 2 illustrates the signal flow between a master requesting control of the AHB bus, the arbiter performing the arbitration decision and the slave selected by the master for a command to be executed in this standard AMBA system. AHB bus arbiter 110, AHB master 200 and AHB slave 210 each receive a reset signal HResetx 222 and a clock signal HClockx 223. The AHB master 200 makes the request of AHB arbiter 110 by activating HBusReqx signal 231. The AHB master 200 receives permission from AHB arbiter 110 by HGrantx signal 232. The AHB master 200 confirms the grant and locks this arbitration decision by HLockx signal 233. AHB master 200 then sends address 205 to AHB decoder 111. AHB decoder 111 activates a select signal 112 supplied to the selected slave device. In this example the selected slave device is AHB slave 210. The interaction of AHB master 200 and AHB slave 210 is completed via the control signals 213 and acknowledged via HResp signal 211 and HReady signal 212. Data for read and write operations flows between all masters and all slaves via the AHB bus 100. AHB slave 210 supplies data to AHB bus 100 via HRData bus 206 and receives data from AHB bus 100 via HWData bus 207. Likewise, AHB master 200 receives data from AHB bus 100 via HRData bus 208 and supplies data to AHB bus 100 via HWData bus 209. Note in this regard that reads and writes are considered from the point of view of AHB master 200. Thus in a data read data flows from AHB slave 210 to AHB bus 100 via HRData bus 206 and from AHB bus 100 via HRData bus 208. Of course only one master is activated at a given time and this master selects only one slave on which it will execute a transfer (read or write) command.

Figure 3:
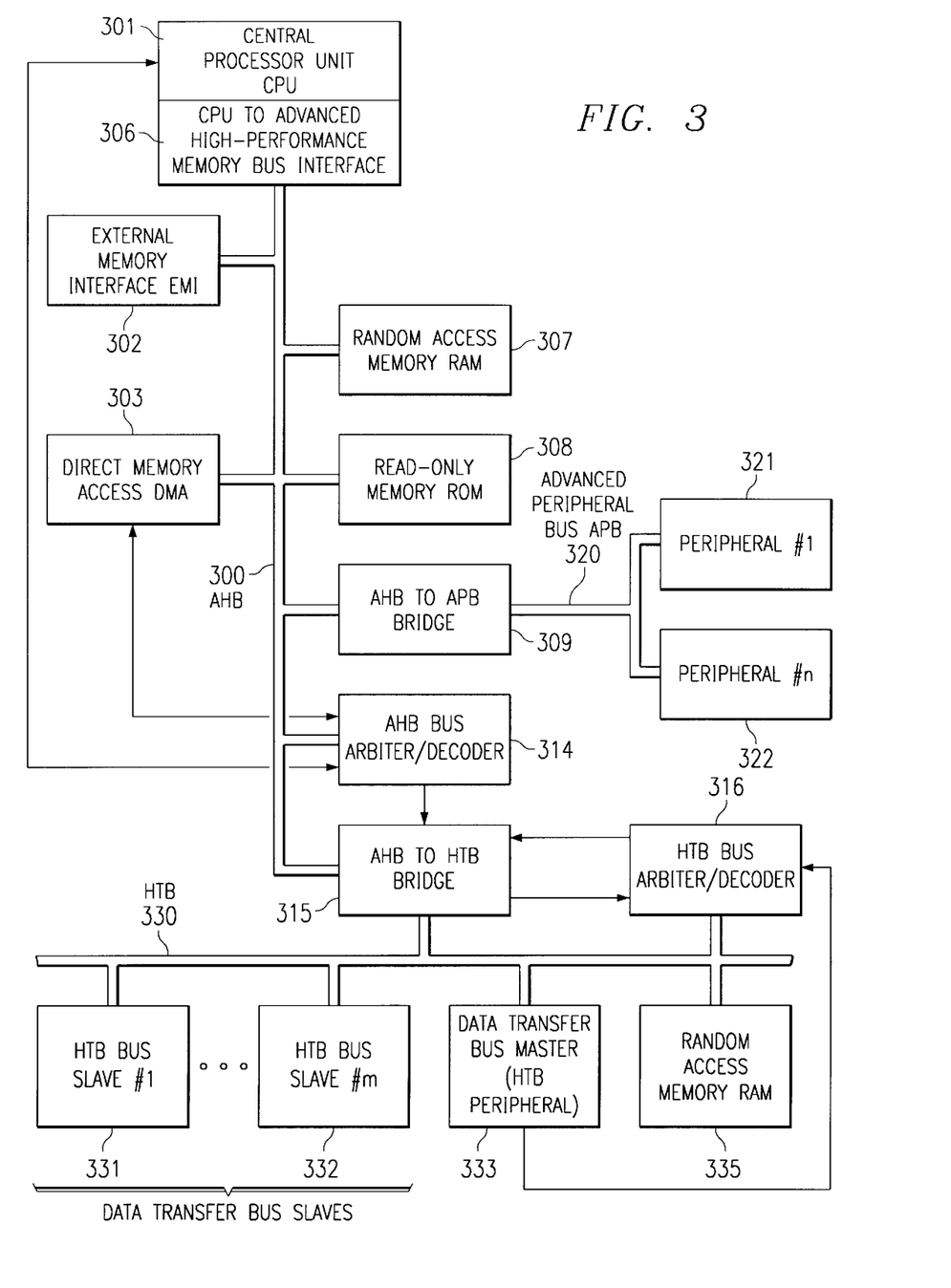
FIG. 3 illustrates the block diagram of an enhanced advanced micro-controller bus architecture having the multiple transaction two AHB-style bus system of this invention with two arbitrators.

FIG. 3 illustrates the multiple transaction advanced high performance bus system (MTAHB) of this invention. The MTAHB uses two AHB-style buses: AHB bus 300 retained as a memory bus; and HTB bus 330 provided for high data transfer bus. AHB bus 300 has AHB bus arbiter/decoder 314 and HTB bus 330 has HTB bus arbiter/decoder 316. Communication between AHB bus 300 and HTB bus 330 takes place via AHB-to-HTB bus bridge 315. AHB-to-HTB bus bridge 315 provides more than just isolation between AHB bus 300 and HTB bus 330. AHB-to-HTB bus bridge 315 also allows for efficient communication between the two high performance busses. In this respect, MTAHB provides three main features:

1. a write buffer to reduce the number of stalls to the CPU 310 while writing to HTB bus 330;
2. a time-out counter allowing CPU 301 to change tasks if a read of HTB bus 330 takes too long; and
3. a set of control registers and control logic as required in bus-master devices.

The AHB bus 300 should contain as slaves only the blocks closely related to memory as well as AHB-to-APB bus bridge 309 to APB bus 320 and AHB-to-HTB bus bridge 315 to HTB bus 330. Note that APB bus 320 connects to moderate performance peripherals 321 to 322 in the same manner as illustrated in FIG. 1. HTB bus 330 contains bus slave peripherals 331 and 332, bus master peripheral 333 and RAM 335. HTB bus 330 supports only two bus masters, high priority data transfer bus master peripheral 333 and AHB-to-HTB bus bridge 315. If more bus masters are required, another HTB bus can be added to the system through the use of another AHB-to-HTB bus bridge, connected as a slave on AHB bus 300.

Figure 4:
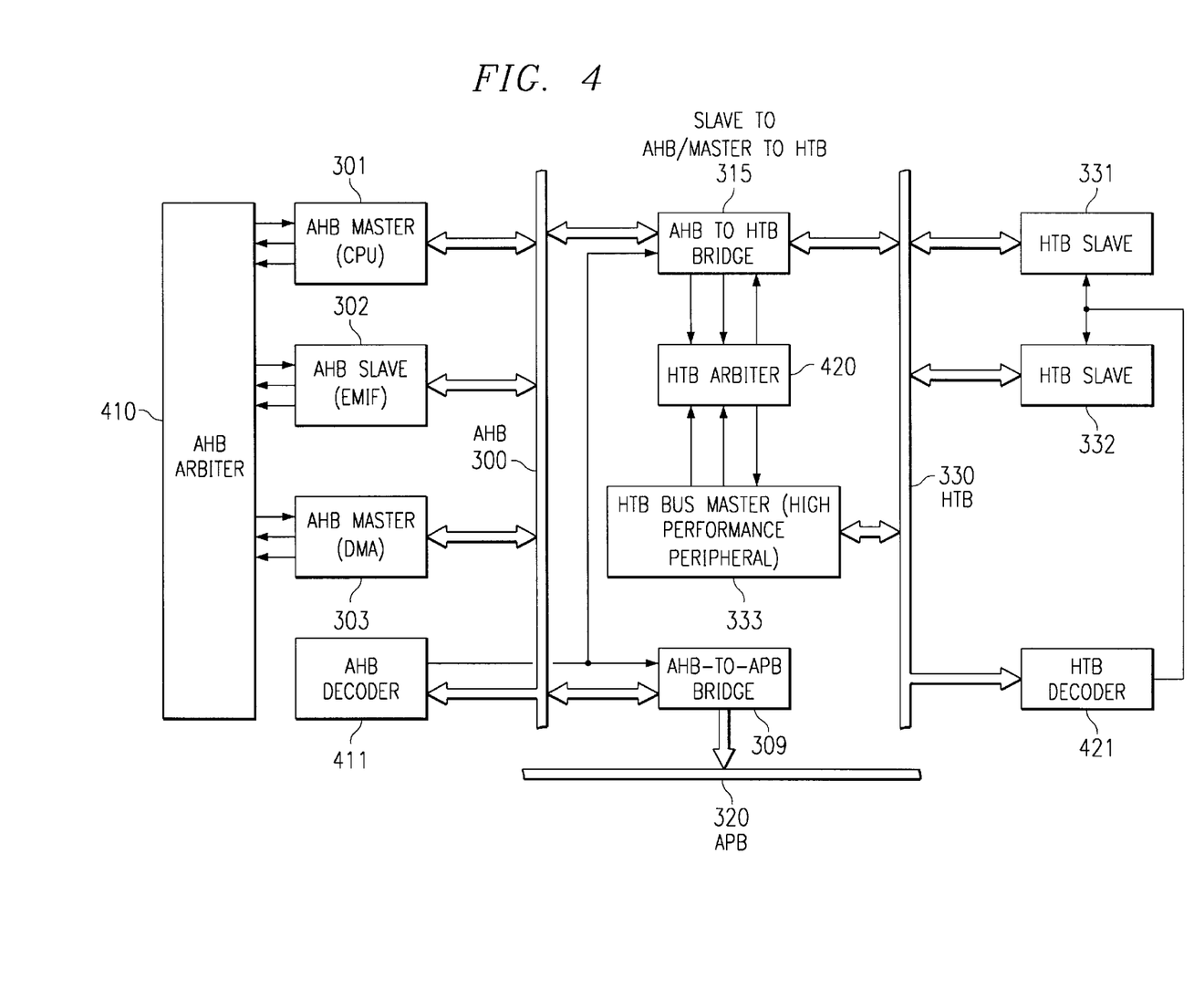
FIG. 4 illustrates the arrangement of masters, slaves, arbiters, and decoders on the multiple transaction, two AHB bus system of this invention.

FIG. 4 is a diagram of the major signal flow features of the MTAHB system. In FIG. 4, AHB bus arbiter/decoder 314 illustrated in FIG. 3 is represented by AHB arbiter 410 and AHB decoder 411. In FIG. 4, HTB bus arbiter/decoder 316 illustrated in FIG. 3 is represented by HTB bus arbiter 420 and HTB bus decoder 421. Note that the AHB-to-HTB bus bridge 315 is a master on HTB bus 330, but a slave on AHB bus 300. HTB bus arbiter 420 differs from AHB bus arbiter 410. In a real-time application, events that trigger HTB peripheral 333 occur externally to CPU 301. A priority scheme must be created that will insure the speedy transfer of data from HTB peripheral 333 to its destination which may be another peripheral or RAM. Due to the non-deterministic behavior inherent to AHB bus arbitration, the high data transfer bus arbiter 420 will always grant HTB bus 330 to the peripheral on the highest channel.

Figure 6:
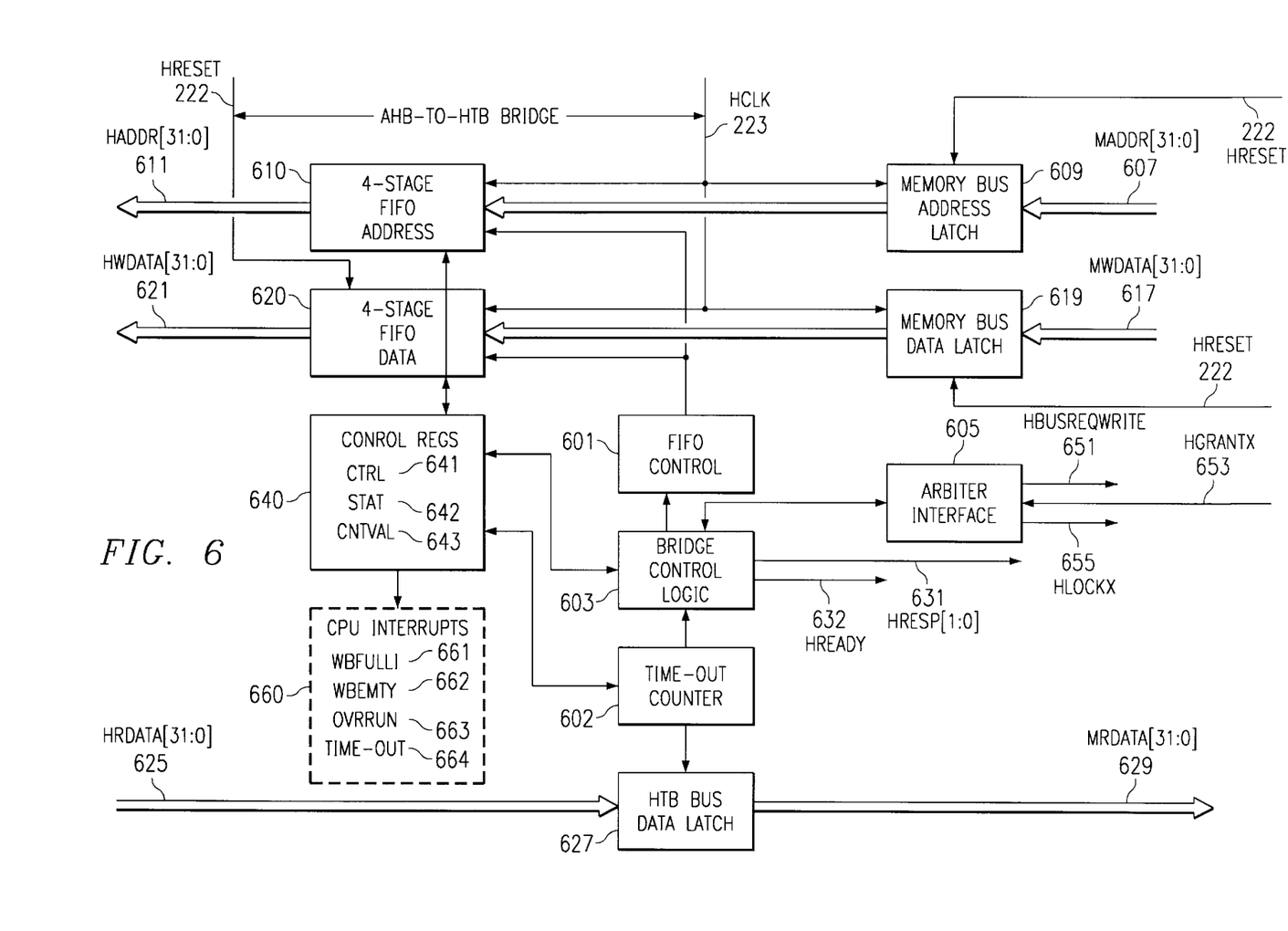
FIG. 6 illustrates the AHB-to-HTB bus bridge block diagram.

Referring to FIG. 4, even if the AHB-to-HTB bus bridge 315 has control of the HTB bus 330, if the other bus master HTB peripheral 333 requests control, HTB bus arbiter 420 will suspend the current AHB-to-HTB operation and grant control to HTB peripheral 333. During this stall, AHB-to-HTB bus bridge 315 will accept write operations into a write buffer. If stalled during read operations, AHB-to-HTB bus bridge 315 will initiate time-out counter 602 (FIG. 6).

There will only be two possible masters on HTB bus 330: HTB peripheral 333; and AHB-to-HTB bus bridge 315. HTB peripheral 333 will occupy a higher priority than AHB-to-HTB bus bridge 315.

Figure 5:
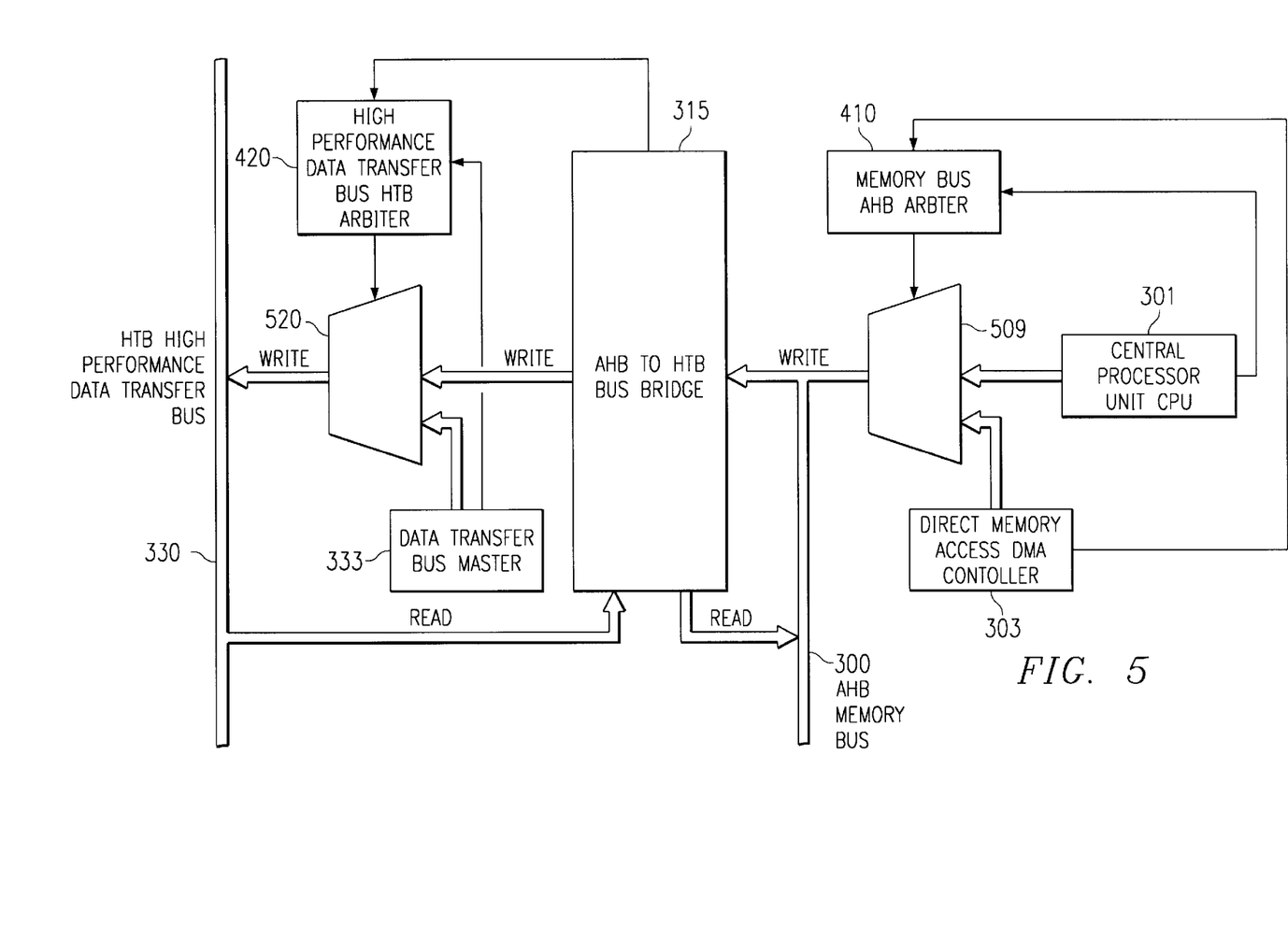
FIG. 5 illustrates the interactions between AHB memory bus arbiter and HTB high performance data transfer bus arbiter functions.

FIG. 5 illustrates the interactions between AHB bus arbiter 410 and HTB bus arbiter 420. When a device on the AHB bus 300, such as CPU 301 or DMA 303, wishes to communicate with a device on HTB bus 330 the following steps must occur. First, the device (CPU 301 or DMA 303) must win arbitration on the AHB bus 300. This is shown pictorially as a multiplexing operation where multiplexer 509 under control of AHB bus arbiter 410 selectively couples either CPU 301 or DMA 303 to AHB bus 300. In the actual implementation it is more common to tie attach three-state I/O interface stages from each device attached to the bus.

Next, AHB-to-HTB bus bridge 315 must win arbitration on the HTB bus 330. This is also shown as a multiplexing operation where multiplexer 520 under control of HTB arbiter 420 selectively couples either AHB-to-HTB bus bridge 315 or HTB bus master 333 to HTB bus 330. During this period when the arbitrations are pending, AHB-to-HTB bus bridge 315 must hold AHB bus 300 while waiting for HTB arbitration. This can seriously degrade system performance since no activity will be occurring on AHB bus 300 during this period. AHB bus 300 will be the most active bus in most systems. To relieve this stall condition during a write condition, a write buffer is provided within AHB-to-HTB bus bridge 315.

FIG. 6 illustrates the internal construction of AHB-to-HTB bus bridge 315. AHB-to-HTB bus bridge 315 includes FIFO control 601, bridge control logic 603 and AHB-HTB time-out counter 602 as shown. The full codings of control registers 640 (including CTRL register 641, STAT register 642 and CNTVAL register 643) are described below. Each of the control registers of control registers 640 are accessible by CPU 301. The write buffer is essentially a pair of FIFOs 610 and 620 with respective input register stages 609 and 619. Address FIFO 610 and data FIFO 620 have the same number of stages. FIG. 6 illustrates an example of 4 stages. Memory bus address latch 609 latches the full address from AHB bus 300. Memory bus data latch 619 latches the data from AHB bus 300. This differs from a traditional write buffer used in a cache scheme, where either the address or data is usually latched and then written back to the memory. The write buffer of this invention allows an AHB bus device to write data to the HTB bus device without having to wait for arbitration. So long as the write buffer is not full, AHB bus 300 will not stall due to waiting for arbitration on HTB bus 330.

If write buffer FIFOs 610 and 620 becomes full, bridge control logic 603 sets a WBFULL status bit within STAT register 642. If an interrupt is enabled via a WBFULLE bit of CTRL register 641, then bridge control logic 603 generates an interrupt WBFULLI 661. If AHB bus 300 writes another word when the write buffer FIFOs 610 and 620 are full, the previous word will be overwritten and lost. Under these conditions bridge control logic 603 generates OVR-RUN interrupt 663 if overrun interrupts are enabled via a WBOI bit of STAT register 642. To prevent the loss of data, software of each writing device must make sure an overrun condition is not created. When a full buffer becomes empty, bridge control logic 603 generates another interrupt WBE-MTY 662 if a WBEMTYE bit of STAT register 642 enables such an interrupt.

In order to write to a HTB bus peripheral, CPU 301 or DMA 303 must first be granted control of AHB bus 300 by AHB bus arbiter 410. Then AHB-to-HTB bus bridge 315 must be granted control of HTB bus 330 by HTB bus arbiter 420. When the AHB-to-HTB bus bridge 315 is granted control of HTB bus 330, AHB-to-HTB bus bridge 315 will supply the address latched in address FIFO 610 to HTB bus decoder 421. HTB bus decoder 421 will decode this address to supply the necessary chip select signals analogous to select signal 112 illustrated in FIGS. 1 and 2. Since the entire system contains only one memory map, this will not cause any conflicts to other devices on other busses. When generating this address on HTB bus 330, AHB-to-HTB bus bridge 315 will follow standard AHB bus timings, pipelining the address one cycle before outputting the data.

To prevent possible read-after-write (RAW) errors, if there is any data in write buffer FIFOs 610 and 620, AHB-to-HTB bus bridge 315 will not allow a read from HTB bus 330 until write buffer FIFOs 610 and 620 have cleared. If a read request is made, time-out counter 602 will start while write buffer FIFOs 610 and 620 are emptying data.

Referring again to FIG. 6, when the first word is written to AHB-to-HTB bus bridge 315 from AHB bus 300, the full address will be latched into memory bus address latch 609 and data will be latched in memory bus data latch 619. When latched, the AHB-tO-HTB bus bridge 315 will make a request HBusReqwrite 651 to the HTB Bus 330. A grant is acknowledged by grant signal HGrantx 653. If granted, the address in memory bus address latch 609 will be supplied to HAddr bus 611 and data in memory bus data latch 619 will be supplied to HData bus 621 bypassing the FIFOs 610 and 620. Arbiter interface 605 will also generate HLockx signal 655 to HTB arbiter 420. If not granted, the AHB-to-HTB bus bridge 315 can store more address and data in FIFOs 610 and 620 until these FIFOs are full. When the FIFOs 610 and 620 are full, AHB-to-HTB bus bridge 315 signals a not READY event 632 to the master on AHB bus 300.

Time-out counter 602 starts when AHB-to-HTB bus bridge 315 attempts to arbitrate to obtain control of HTB bus 330. The count of time-out counter 602 is initialized by the value stored in CNTVAL register 643. Time-out counter 602 is selectively enabled by the state of a TOE bit of CTRL register 641. Upon time-out, bridge control logic sets a TOI bit of STAT register 642. Control registers 640 also generates a time-out interrupt 664 if time-out interrupts are enabled by a TOIE bit of CTRL register 641. Following such a time-out, when AHB-to-HTB bus bridge 315 is granted control of HTB bus 330, bridge control logic 603 sets a RAI bit of status register 642. Additionally, ABH-to-HTB bus bridge 315 generates a read available interrupt (RAI) if RAI interrupt is enabled by the RAIE bit of CTRL register 641.

The following is a summary of the content of the three control registers illustrated as block 640 of FIG. 6 which are a part of AHB-to-HTB bus bridge 315. The coding of control register CTRL 641 is listed in Table 1.

TABLE 1

| Bits | Mnemonic | Definition |
|------|----------|------------|
| 15:7 | Reserved | Reads undefined, writes no effect |
|      |          | Write Buffer Full Interrupt Enable |
|      |          | If Write Buffer Full |
| 6    | WBFULLE  | 0 = no interrupt: 1 = will interrupt |
|      |          | Write Buffer Empty Interrupt Enable |
|      |          | If Write Buffer Empty |
| 5    | WBEMTYE  | 0 = no interrupt: 1 = will interrupt |
|      |          | Read Available Interrupt Enable |
|      |          | If Read Available |
| 4    | RAIE     | 0 = no interrupt: 1 = will interrupt |
|      |          | Write Buffer Over-run Interrupt Enable |
|      |          | If Write Buffer Over-run |
| 3    | WBOIE    | 0 = no interrupt: 1 = will interrupt |
|      |          | Write Buffer Enable |
| 2    | WBE      | 0 = not enabled: 1 = enabled |
|      |          | Time-Out Interrupt Enable |
|      |          | If Time-Out Counter reaches 0x00 |
| 1    | TOIE     | 0 = no interrupt: 1 = will interrupt |
|      |          | Time-Out Enable |
| 0    | TOE      | 0 = not enabled: 1 = enabled |

Regarding the Write Buffer Enable bit (WBE), the size of the write buffer is determined upon manufacture. The example of FIG. 6 includes a four stage write buffer. Regarding the Time-out interrupt enable bit (TOIE), when the time-out counter 602 reaches 0x00, an interrupt is generated. If this bit is set, the interrupt will be sent to CPU 301. Regarding the time-out enable bit (TOE), this selectively enables time-out counter 602. This can be used to free CPU 301 to perform another task if AHB-to-HTB bus bridge 315 cannot win arbitration on HTB 330 bus in the time period of time-out counter 602.

The coding of status register STATUS 642 is listed in Table 2.

TABLE 2

| Bits | Mnemonic | Definition |
| --- | --- | --- |
| 15:6 | Reserved | Reads undefined, writes no effect |
| 5 | WBFULL | Write Buffer Full<br>0 = not full: 1 = full |
| 4 | WBEMTY | Write Buffer Empty<br>0 = not empty: 1 = empty |
| 3 | RAI | Read Available Interrupt<br>After a time-out event, AHB-to-HTB bus bridge has finally won arbitration<br>0 = Data may not be read from HTB bus<br>1 = Data may be read from HTB bus |
| 2 | WBOI | Write Buffer Overrun Interrupt<br>0 = Data not overwritten:<br>1 = Data overwritten |
| 1 | WBF | Write Buffer Full.<br>0 = not full: 1 = full |
| 0 | TOI | Time-Out Interrupt<br>0 = No Time-Out or not enabled<br>1 = Time-Out counter has reached 0 |

Regarding the write buffer full bit (WBF), it is generally used to detect when the entire write buffer has been filled by writes to AHB-to-HTB bus bridge 315 and write buffer FIFOs 610 and 620 have not had a chance to write the data to HTB bus 330. This bit will become inactive as soon as a single location within write buffer FIFOs 610 and 620 is free. If write buffer FIFOs 610 and 620 are full and another write occurs, the previous data in the write buffer will be lost. Regarding the write buffer empty bit (WBEMTY), this is active when the entire write buffer FIFOs 610 and 620 are empty. If write buffer FIFOs 610 and 620 had been full previously and then becomes empty, an interrupt is generated. Regarding the read available interrupt bit (RAI), this indicates that, after a time-out has occurred, that AHB-to-HTB bus bridge 315 has finally won arbitration and that the AHB bus device may proceed with a read. Regarding the write buffer overrun interrupt bit (WBOI), this indicates that the buffer was full and another write occurred, overwriting some data. This should not happen in normal operation. When write buffer FIFOs 610 and 620 are full, an HReady signal 632 on AHB bus 300 will be pulled high by AHB-to-HTB bus bridge 315 indicating no more transfers should occur. Regarding the write buffer full bit (WBF), this is a read-only status signal which indicates that write buffer FIFOs 610 and 620 are full and cannot accept new data. When active the write buffer full bit (WBF) also indicates that HReady signal 632 is active for AHB-to-HTB bus bridge 315. Regarding the time-out interrupt bit (TOI), this is active when time-out counter 602 reaches 0. This timer is provided so that during a read to HTB 330, if an unacceptable amount of time is required to win arbitration by AHB-to-HTB bus bridge 315 on behalf of CPU 301, that CPU 301 may switch to another task and continue doing useful work.

The coding of counter value register CNTVAL 643 is listed in Table 3.

TABLE 3

| Bits | Mnemonic | Definition |
| --- | --- | --- |
| 15:0 | CNTVAL | Start value for the Time-Out counter<br>The number of HCLK cycles to time-out |

The counter value register CNTVAL 643 stores the start value for time-out counter 602. Upon expiration of the count of time-out counter 602, bridge control logic generates time-out interrupt 664 if the TOIE bit of CTRL register 641 enables such interrupts. Note that the TOE bit of CTRL register 641 controls whether time-out counter 603 is enabled or disabled. This counter may be used during a read operation. If a peripheral already has won arbitration of HTB bus 330 and will not relinquish control due to a real-time constraint, the user may program a value here that will determine how many HCLK cycles to wait before causing a time-out interrupt. This time-out interrupt will permit CPU 301 on AHB bus 300 to stop waiting for a HTB bus grant and continue doing other operations such as running another task.

AHB-to-HTB bus bridge 315 further includes HTB bus data latch 627. HTB bus latch 627 latches data from read from HTB bus 330 via HRData bus 625 and supplies data to the AHB bus 300 via MRData bus 629. Note that AHB-to-HTB bus bridge 315 is a slave to AHB bus 300. Thus AHB-to-HTB bus bridge 315 cannot make a read or write request on AHB bus 300. Since AHB-to-HTB bus bridge 315 cannot make read or write requests, it cannot source an address to AHB bus 300. Accordingly, AHB-to-HTB bus bridge 315 does not need a HTB bus address latch.

What is claimed is:

1. A data transfer system comprising:
    a plurality of first bus devices, at least one first bus device being a first bus data supplying device capable of supplying data, at least one first bus device being a first bus data receiving device capable of receiving data and at least one first bus device being a first bus master device capable of requesting and controlling data transfer;
    a first data bus connected to each of said plurality of first bus devices and capable of transferring data from a first bus data supplying device to a first bus data receiving device under control of a first bus master device;
    a plurality of second bus devices, at least one second bus device being a second bus data supplying device capable of supplying data, at least one second bus device being a second bus data receiving device capable of receiving data and only one second bus device being a second bus master device capable of requesting and controlling data transfer;
    a second data bus connected to each of said plurality of second bus devices and capable of transferring data from a second bus data supplying device to a second bus data receiving device under control of said second bus master device;
    a bus bridge connected to said first data bus and said second data bus, said bus bridge capable of supplying data to said first bus, receiving data from said first bus, supplying data to said second bus, receiving data from said second bus, said bus bridge operating as a first bus slave device not capable of requesting and controlling data transfer on said first bus and said bus bridge operating as a second bus master device capable of requesting and controlling data transfer on said second bus;

whereby said data transfer system is capable of
transferring data between two first bus devices via said first bus independently and concurrently with transferring data between two second bus devices via said second bus,
transferring data from said first bus to said second bus via said bus bridge, and
transferring data from said second bus to said first bus via said bus bridge.

2. The data transfer system of claim 1, further comprising:
a first bus arbiter connected to each of said at least one first bus master device and said first bus, said first bus arbiter granting control of data transfer on said first bus to one and only one first bus master; and
a second bus arbiter connected to each of said second bus master device, said second bus and said bus bridge, said second bus arbiter granting control of data transfer on said second bus to one and only one of said second bus master device and said bus bridge, said second bus arbiter granting said second bus master device higher priority than said bus bridge whereby said second bus arbiter will suspend a data transfer controlled said bus bridge upon receipt of a second bus request by said second bus master.

3. The data transfer system of claim 2, wherein:
at least one first bus supplying/receiving device consists of a central processing unit which is a first bus master device capable of requesting and controlling data transfer, said central processing unit responsive to at least one interrupt; and
said bus bridge further includes a timer having a preset time, said timer started when said bus bridge attempts to arbitrate for control of said second bus, said timer generating a time-out interrupt of said central processing unit upon expiration of said preset time.

4. The data transfer system of claim 3, wherein:
said timer includes a count value register loadable by said central processing unit, said preset time of said timer corresponding to a count value stored in said count value register.

5. The data transfer system of claim 3, wherein:
said bus bridge generating a read available interrupt of said central processing unit upon grant of control of data transfer on said second bus by said second bus arbiter following expiration of said preset time.

6. The data transfer system of claim 1, wherein:
at least one first bus device being a first bus supplying/receiving device capable of both supplying data to said first bus and receiving data from said first bus.

7. The data transfer system of claim 6, wherein:
at least one first bus supplying/receiving device consists of a central processing unit which is further capable of requesting and controlling data transfer.

8. The data transfer system of claim 6, wherein:
at least one first bus supplying/receiving device consists of a direct memory access unit which is further capable of requesting and controlling data transfer.

9. The data transfer system of claim 6, wherein:
at least one first bus supplying/receiving device consists of a memory which is not capable of requesting and controlling data transfer.

10. The data transfer system of claim 6, wherein:
at least one first bus supplying/receiving device consists of a central processing unit which is a first bus master device capable of requesting and controlling data transfer; and
said at least one second bus master device is responsive to real time events asynchronous to operation of said central processing unit.

11. The data transfer system of claim 1, wherein: said bus bridge further includes
an address first-in-first-out buffer having an input connected to said first bus and an output connected to said second bus for storing a predetermined number of addresses from said first bus, and
a data first-in-first-out buffer having an input connected to said first bus and an output connected to said second bus for storing a predetermined number of data words from said first bus.

12. The data transfer system of claim 11, wherein:
said bus bridge further operates to defer requests for data transfer from a second bus device to a first bus device while said data first-in-first-out buffer stores data.

* * * * *